(12) United States Patent
Bertin et al.

(10) Patent No.: US 7,853,807 B2
(45) Date of Patent: Dec. 14, 2010

(54) MULTIMEDIA APPARATUS RECEIVING AUDIO-VISUAL BROADCAST

(75) Inventors: Jean-Pierre Bertin, Guemene-Penfao (FR); Xavier Guitton, Montgermont (FR); Philippe Lepoil, Chantepie (FR)

(73) Assignee: Thomson Licensing, Boulogne Billancourt (FR)

( * ) Notice: Subject to any disclaimer, the term of this patent is extended or adjusted under 35 U.S.C. 154(b) by 2094 days.

(21) Appl. No.: 10/311,725

(22) PCT Filed: Jun. 27, 2001

(86) PCT No.: PCT/FR01/02038
§ 371 (c)(1),
(2), (4) Date: Jul. 18, 2003

(87) PCT Pub. No.: WO02/01865
PCT Pub. Date: Jan. 3, 2002

(65) Prior Publication Data
US 2004/0025188 A1 Feb. 5, 2004

(30) Foreign Application Priority Data
Jun. 27, 2000 (FR) .................................. 00 08238

(51) Int. Cl.
*G06F 13/00* (2006.01)
(52) U.S. Cl. .................. 713/300; 713/310; 713/320; 713/321; 713/322; 713/323; 713/324; 713/330; 713/340
(58) Field of Classification Search .................. 713/300, 713/310, 320–324, 330, 340
See application file for complete search history.

(56) References Cited
U.S. PATENT DOCUMENTS
5,666,293 A 9/1997 Metz et al. ............... 395/200.5

5,954,820 A 9/1999 Hetzler (Continued)

FOREIGN PATENT DOCUMENTS
EP 896318 2/1999

(Continued)

*Primary Examiner*—Abdelmoniem Elamin
(74) *Attorney, Agent, or Firm*—Robert D. Shedd; Paul P. Kiel

(57) ABSTRACT

The present invention relates to a transmission reception multimedia apparatus (20) comprising a circuit for communication (9, 8, 10, 3, 7) with means for connection to an audiovisual communication network (21) characterized in that it comprises:
a connector (11) of a bus for communication with a source apparatus (17) comprising at least one conductor (VBUS) for the transmission of a supply voltage providing by the source apparatus (17);
means of detection (1) of the presence of the said supply voltage, the said means of detection (1) being linked to the connector (11), the said means of detection (1) generating, a detection signal on the appearance of the supply voltage, bound for the communication circuit (9, 8, 10, 3, 7), the said communication circuit (9, 8, 10, 3, 7) being linked to the means of detection, so as to switch via a switching circuit (3) the multimedia apparatus (20) from a first operating mode, termed standby, in which the communication circuit (9, 8, 10, 3, 7) has the minimum of active functions to a second operating mode, termed wakeup, in which the communication circuit (9, 8, 10, 3, 7) has its function of communication, between the connector (11) and the audiovisual network, activated, the switching being consequent upon the appearance of the bus supply voltage.

10 Claims, 2 Drawing Sheets

U.S. PATENT DOCUMENTS

| | | | |
|---|---|---|---|
| 6,239,845 B1 * | 5/2001 | Itagaki et al. | 348/552 |
| 6,880,036 B2 * | 4/2005 | Bertin et al. | 710/313 |
| 7,320,136 B1 * | 1/2008 | Yu | 725/89 |

FOREIGN PATENT DOCUMENTS

| | | |
|---|---|---|
| EP | 999702 | 5/2000 |
| JP | 11212681 | 8/1999 |
| WO | WO 99/08196 | 2/1999 |

* cited by examiner

MULTIMEDIA APPARATUS RECEIVING AUDIO-VISUAL BROADCAST

This application claims the benefit, under 35 U.S.C. §365 of International Application PCT/FR01/02038, filed Jun. 27, 2001, which was published in accordance with PCT Article 21(2) on Jan. 3, 2002 in French and which claims the benefit of French patent application No. 00/08238 filed Jun. 27, 2000.

The present invention relates to an audiovisual transmission reception multimedia apparatus which can, for example, be linked to a personal computer. The audiovisual transmission reception multimedia apparatus can, for example, consist of a decoder or any other apparatus that can be linked to a bi-directional cable network.

Most digital decoders for cable television network will be equipped with a return path. This return path will be used for functions of interactivity between the user of the decoded audio video programme and the operator of the television network.

Contemporary digital decoders, in order to comply with the European standard in force, exhibit a low-consumption standby mode. This state is attained when only the functions indispensable to the waking up of the multimedia apparatus are powered up. For example, the decoder then in standby mode must be able to be woken up, in order to perform the recording of a television programme on a video recorder. This wakeup function is activated either via the remote control of the decoder, or via the keypad of the front panel of the decoder. A signal transmitted by the remote control and received by the photoreceptor on the front panel of the decoder or activation of the keys of the keypad will cause an interrupt on the keypad processor of the decoder, this being the only processor to remain active permanently and to monitor the interrupts which may be caused by one of these two events. When such a processor detects such an event, it triggers the decoder wakeup mode which requires a sequence of a few seconds. Such a decoder cannot therefore be used as communication interface between a PC and an operator if it is not provided with a device enabling it to be woken up.

A first aim of the invention is to provide an audiovisual transmission reception multimedia apparatus, such as for example a digital decoder, with the necessary equipment to make it possible to go from a reduced operating mode, for example standby, to a normal operating mode, allowing in particular the connection of a source apparatus, such as for example a computer, to the Internet.

This aim is achieved through the fact that the audiovisual transmission reception multimedia apparatus comprises:
  a circuit for communication with means of connection to an audiovisual communication network,
  a connector of a bus for communication with a source apparatus comprising at least one conductor (VBUS) for the transmission of a supply voltage provided by the source apparatus;
  means of detection of the presence of the said supply voltage, the said means of detection being linked to the connector, the said means of detection generating a detection signal on the appearance of the supply voltage, bound for the communication circuit, the said communication circuit being linked to the means of detection, so as to switch via a switching circuit the multimedia apparatus from a first operating mode, termed standby, in which the communication circuit has the minimum of active functions to a second operating mode, termed wakeup, in which the communication circuit has its function of communication, between the connector and the audiovisual network, activated, the switching being consequent upon the appearance of the bus supply voltage.

According to another feature, the connector is a client connector (11) of USB (Universal Serial Bus) type.

According to another feature, the switching circuit is constituted by a first microprocessor of a means of control of the multimedia apparatus and of a programme for triggering the wakeup actions constituting the communication circuit wakeup sequence.

According to another feature, the means of control is a control keypad and/or a remote control receiver of the said multimedia apparatus, the said means of control being linked to an interrupt input of the said first microprocessor.

According to another feature, the means of detection are linked to an interrupt input of the first microprocessor receiving the detection signal.

According to another feature, the first microprocessor is linked to a general supply circuit of the multimedia apparatus so as to activate the said supply circuit in response to the appearance of the detection signal.

According to another feature, the means of detection consist of an electronic breaker generating a voltage on one of the inputs of the first microprocessor.

According to another feature, the said apparatus comprises a digital television decoder, the said communication circuit comprising a circuit for connection to a bidirectional cable network.

According to another feature, the said apparatus comprises an interface circuit matched to the type of connector linked to the internal bus of the digital decoder linking a main processor of the decoder to a return channel processor of the digital decoder, the said return channel processor being linked, by an interface circuit to a cable for linkage to the bidirectional cable network linking the digital decoder to the service of the server of the audiovisual operator.

According to another feature, the said apparatus comprises means for triggering the connection to the Internet through the service of the server of the audiovisual operator.

Other features and advantages of the invention will become more clearly apparent on reading the description below given with reference to the appended drawings in which.

Figure 1:
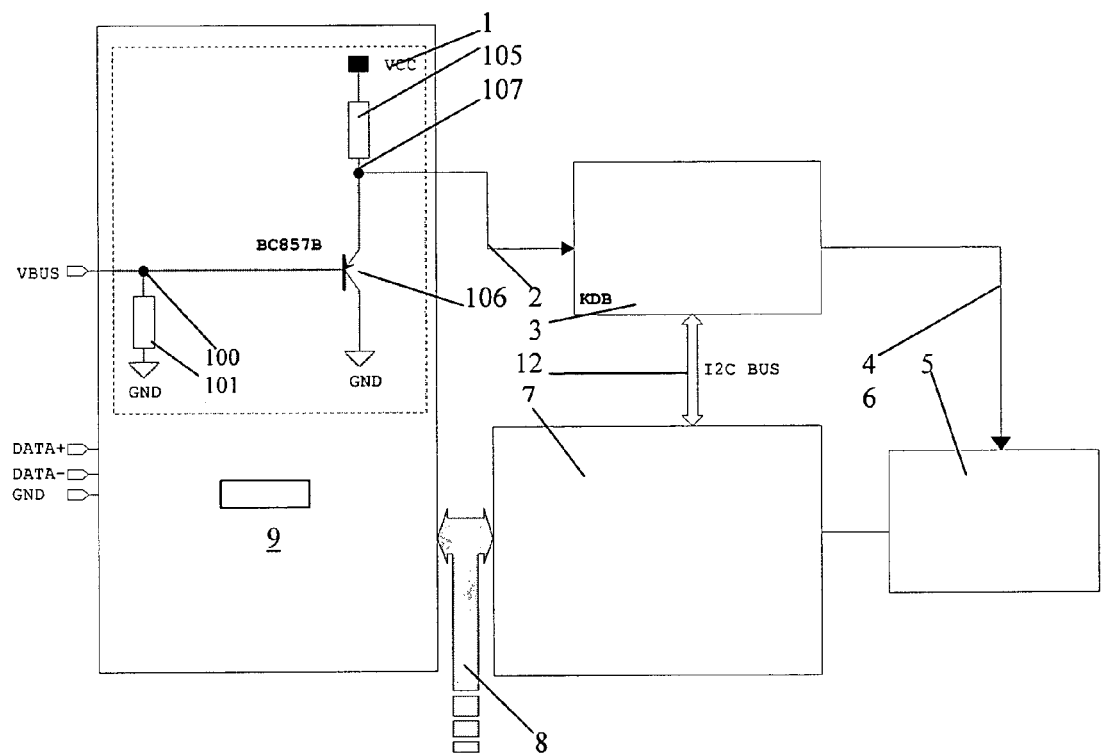
FIG. 1 represents a diagrammatic view of the wakeup device according to the invention.

A nonlimiting embodiment of the invention will now be described with FIGS. 1 and 2.

A personal computer (17) portable or otherwise is linked by a cable (16) of USB (Universal Serial Bus) type to a USB connector (11) forming part of a decoder (20). The computer (20) here plays the role of master of the USB bus. The computer is used here by way of exemplary source apparatus, but any other electronic apparatus requesting connection to an Internet network may also be used. The decoder (20) is given by way of exemplary multimedia apparatus with reduced operating mode but the invention may be applied to any another type of multimedia apparatus for audiovisual transmission reception. The decoder (20) is linked to a specific cable for the digital television (14) which allows, via a service of the server (21) of the operator, connection to the Internet through the service of the server centre 21 of the audiovisual operator. The benefit of such a system is to allow:

on the one hand a fast link with a bit rate of 12 megabits between the personal computer and the decoder via the USB cable, and on the other hand, by way of the cable (14) linking the decoder to the service of the server (21) of the operator, a high bit rate link (several megabits per second) of the computer to the Internet network.

This link is made possible with a minor modification of the multimedia apparatus, in the example given, of the decoder. This minor modification consists in a USB connector (11) whose input terminal (VBUS) is linked to a circuit (1) for detecting the voltage VBUS (that is to say the USB bus supply voltage generated by the master) being incorporated into the decoder. This circuit (1) belongs to a USB interface circuit (9), which is linked to the input terminals (DATA+, DATA−) and to the earth of the USB connector (11). The output of the detection circuit (1) is linked by a link (2) to an interrupt input of a microprocessor (3) which is the microprocessor of the keypad of the decoder and of the front panel. This microprocessor is linked by a link (4) to the main supply circuit (5) and by an I2C bus (12) to the main processor (7). The main supply powers the main microprocessor (7).

This microprocessor (3) is the only one in the decoder to be permanently active, even when the decoder re-enters standby mode. It suffices for the socket of the decoder to be connected to the power supply network. Specifically, in the standby mode, only this microprocessor permanently monitors its inputs so as to detect signals treated as interrupts representing:

either a signal providing from the keypad of the front panel of the decoder constituting an interrupt in respect of the microprocessor, or a signal, produced by the photoreceptor (19) linked by a link (18) to the microprocessor (3), related to the transmission of a command with the aid of the remote control by the user.

According to the invention it is also used to detect an interrupt related to the detection of the plugging in of a USB connector.

In another variant the microprocessor can permanently monitor its digital inputs (polling) so as to detect changes of states of the inputs and to perform the desirable processing.

While operational, the decoder, when via its microprocessor (3) it detects an interrupt, sends a signal via the link (4) to the decoder assembly main power supply which then powers (link (6)) the main processor (7) so as to wake up the decoder functionalities necessary for the commanded function. This functionality will allow the recording of a TV programme on the video recorder or the screening of a channel received by the decoder on the television or else the use of the decoder as a modem. For these applications of recording or of screening of received channel, the main processor (7) talks to a bus (15) for transporting digital, audio and video signals and the RF reception stage (13) of the decoder which is linked by a branch cable (14') to the input/output cable (14) of the decoder.

Depending on the type of command received by the processor (3), it will be sent via the link (12) of the I2C bus linking the front panel processor (3) to the main processor (7), which will process the information and will talk to the processor (10), across the processor bus (8) which links it to the return channel processor (10). This processor (10) is linked by an output interface to the cable (14) so as to allow interactivity between the operator and the user by transmission and reception of digital data. The keypad or front panel microprocessor (3) is associated via its processor bus (31) with a memory, which contains a programme module (30) which manages the interrupts appearing on the lines (18) so as to trigger, as a function of these interrupts, the waking up of the decoder assembly. The exemplary embodiment of the invention consists in adding along with the detection circuit (1) a line (2) at the output of the VBUS voltage detection circuit (1), this line being sent to a high-level interrupt input of the microprocessor (3) so as to trigger the execution of a programme module (32) performing the processing of this interrupt and carrying out, firstly the sending via the line (4) of a signal for waking up the main power supply (5) of the decoder then via the I2C bus (12), the sending of a command to the main processor (7), so that the latter talks to the microprocessor (10) of the return channel through the processor bus (8) and so as to place the latter on standby awaiting the arrival of signals on its bus (8) providing from the interface card (9) of the USB connector (11). Thus, the role of the interface circuit (9) will be to transform the protocol for exchanging USB signals between the personal computer (17) and the interface circuit (9) into a protocol for compatible communication between the two (10) return channel and (7) main processors by way of the bus (8).

Figure 2:
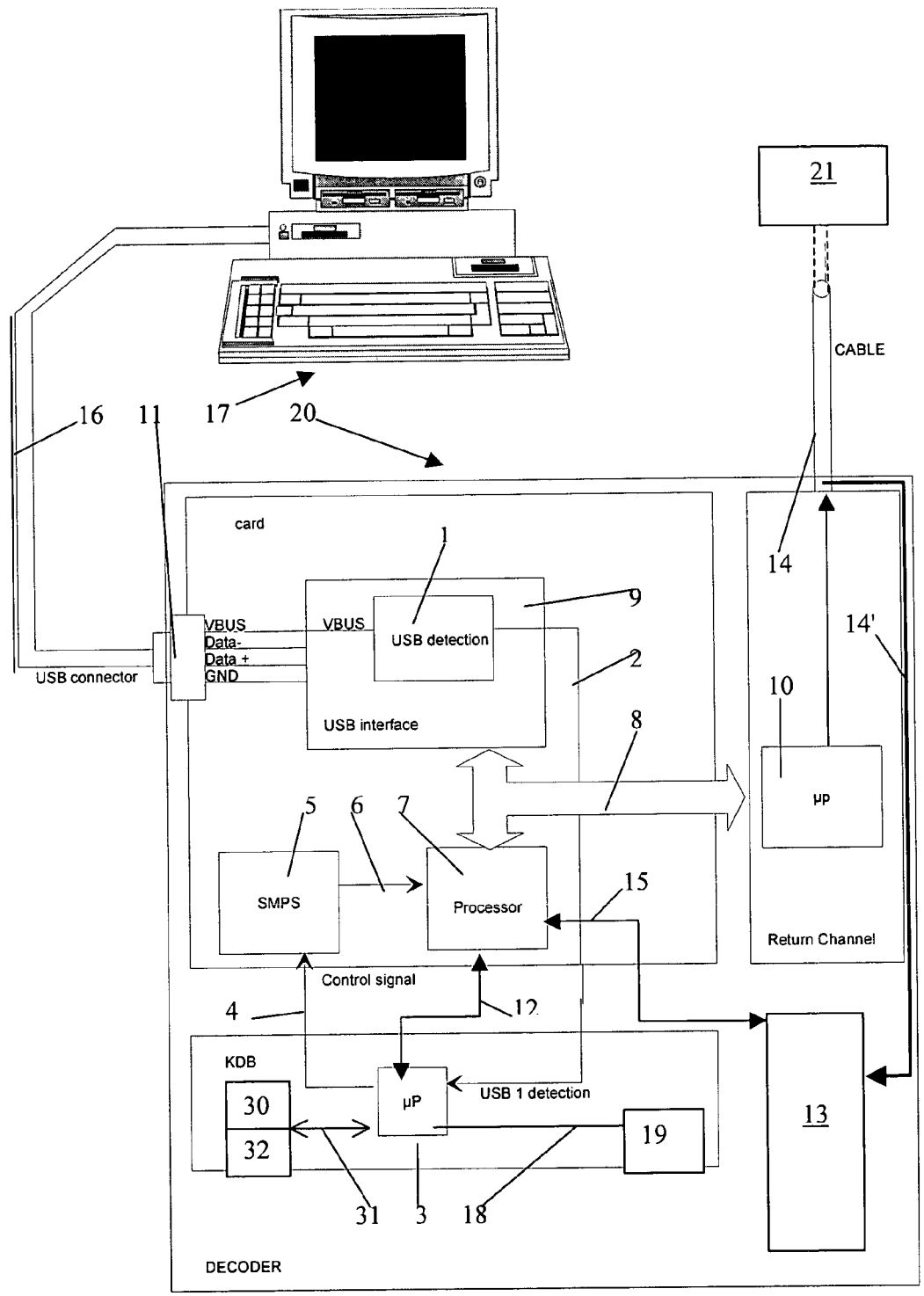
FIG. 2 represents a diagrammatic view of the incorporation of the wakeup device into a decoder and the communication of this decoder with on the one hand a personal computer and on the other hand the cable of the audiovisual transmission broadcasting network.

As may be seen in FIG. 1, the VBUS terminal of the USB connector is linked to a common point (100), which is linked on the one hand through a resistor (101) to earth and on the other hand to the base of a PNP transistor (106). The collector of the PNP transistor is linked to earth and its emitter is linked to the common point (107) and to a resistor (105), whose second end is linked to the VCC voltage supply point. The last common point (107) delivers the signal for detecting the presence of the VBUS voltage on the line (2) which is linked to the higher-level interrupt input of the microprocessor (3) of the front panel. The other elements of FIG. 2 are identical to those of FIG. 1 and are denoted by the same references. When the VBUS voltage is applied to this component and attains a voltage of the order of 4.75 to 5.25 volts, this signifying that the USB cable of a switched-on and woken-up personal computer is connected to the connector (11) of the decoder, the BC857B transistor (106) turns on and the detection signal on the link (2) has a near-zero potential which corresponds to a zero logic level, this triggering the processing at the level of the microprocessor (3) of an interrupt of high level type. This interrupt causes the waking up by the programme module (32) of the part of the decoder necessary for the operation of the circuits effecting the interface between the network cable (14) and the USB cable (16). In the link between the computer (17) and the Internet network, the interface part (9, 10) of the decoder operates in slave mode with respect to the personal computer (17), this signifying that control signals in respect of interactive television functions providing from the remote control are, either momentarily rendered inactive by the main processor (7) and a display controlled by this processor (7) indicates to the user that the interactivity function is interrupted following connection to the Internet, or the microprocessor (7) carries out a multiplexing of these signals with those providing from the personal computer (17). In the latter case, the USB interface (9) incorporates an identifier into the signals providing from the USB bus and the main microprocessor (7) likewise incorporates a different identifier into the signals providing from the remote control, enabling the service (21) of the operator to distinguish between the signals providing from the personal computer (17) and intended for the Internet link and those intended for producing modifications of the services delivered, providing from the remote control. Thus the computer automatically wakes up the decoder by activation of the voltage on the USB bus, thereby making it possible to prepare a communication by way of the cable network.

It should be obvious to those skilled in the art that the present invention allows embodiments in numerous other specific forms without departing from the as-claimed field of application of the invention. Consequently, the present embodiments should be considered by way of illustration but may be modified within the field defined by the scope of the attached claims.

The invention claimed is:

1. Audiovisual transmission reception multimedia apparatus comprising a circuit for communication with means for connection to an audiovisual communication network comprising:
   a connector of a bus for communication with a source apparatus comprising at least one conductor (VBUS) for the transmission of a supply voltage providing by the source apparatus;
   means of detection of the presence of said supply voltage, said means of detection being linked to the connector, said means of detection generating, a detection signal on the appearance of the supply voltage, bound for the communication circuit, said communication circuit being linked to the means of detection, so as to switch via a switching circuit the multimedia apparatus from a first operating mode, termed standby, in which the communication circuit has the minimum of active functions to a second operating mode, termed wakeup, in which the communication circuit has its function of communication, between the connector and the audiovisual network, activated, the switching being consequent upon the appearance of the bus supply voltage.

2. Audiovisual transmission reception multimedia apparatus according to claim 1 wherein the connector is a client connector of USB type.

3. Audiovisual transmission reception multimedia apparatus according to claim 1 or 2, wherein the switching circuit is constituted by a first microprocessor of a means of control of the multimedia apparatus and of a programme for triggering the wakeup actions constituting the communication circuit wakeup sequence.

4. Audiovisual transmission reception multimedia apparatus according to claim 3, wherein the means of control is a control keypad and/or a remote control receiver of said multimedia apparatus, said means of control being linked to an interrupt input of said first microprocessor.

5. Audiovisual transmission reception multimedia apparatus according to one of claims 3 to 4, wherein the means of detection are linked to an interrupt input of the first microprocessor receiving the detection signal.

6. Audiovisual transmission reception multimedia apparatus according to one of the preceding claims, wherein the first microprocessor is linked to a general supply circuit of the multimedia apparatus so as to activate said supply circuit in response to the appearance of the detection signal.

7. Audiovisual transmission reception multimedia apparatus according to claim 5, wherein the means of detection consist of an electronic breaker generating a voltage on one of the inputs of the first microprocessor.

8. Audiovisual transmission reception multimedia apparatus according to one of the preceding claims, wherein said apparatus comprises a digital television decoder, said communication circuit comprising a circuit for connection to a bidirectional cable network.

9. Audiovisual transmission reception multimedia apparatus according to claim 8, wherein said apparatus comprises an interface circuit matched to the type of connector linked to the internal bus of the digital decoder linking a main processor of the digital decoder to a return channel processor of the decoder, said return channel processor being linked, by an interface circuit to a cable for linkage to the bidirectional cable network linking the digital decoder to the service of the server of the audiovisual operator.

10. Audiovisual transmission reception multimedia apparatus according to one of the preceding claims, wherein said apparatus comprises means for triggering the connection to the internet through the service of the server of the audiovisual operator.

* * * * *